Jan. 6, 1970     HIROSHI MIYAZIMA     3,487,737
LEG MEMBER OF WOODEN FURNITURE
Filed June 27, 1968
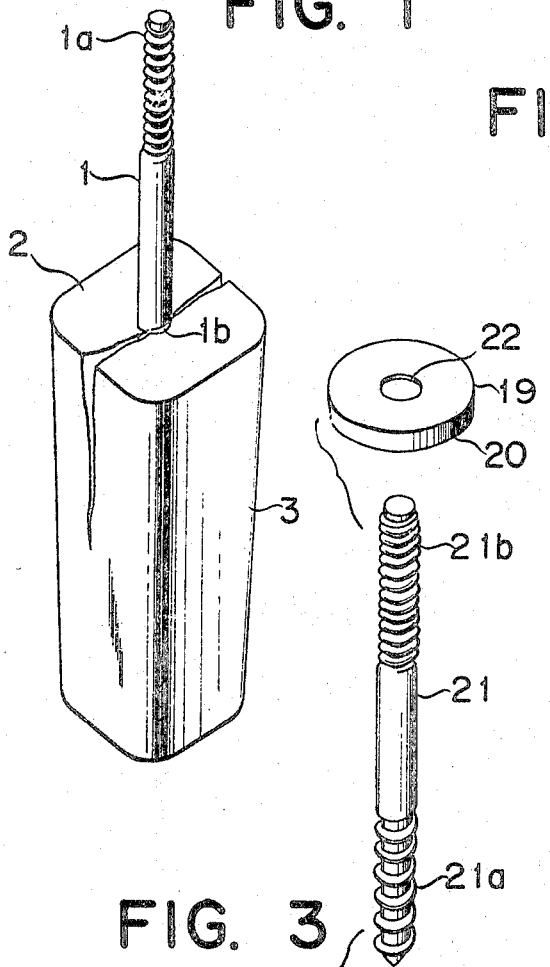
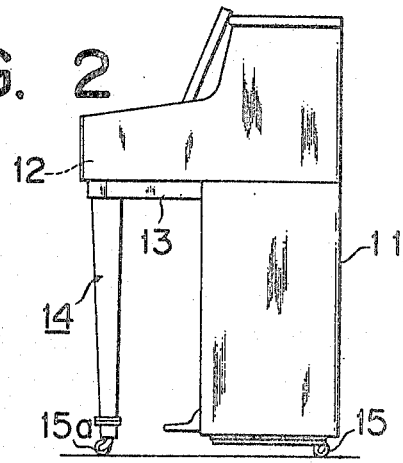
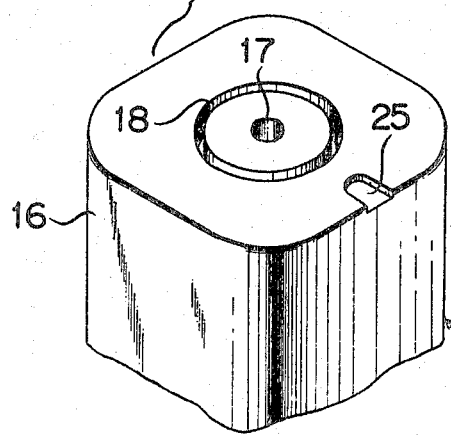
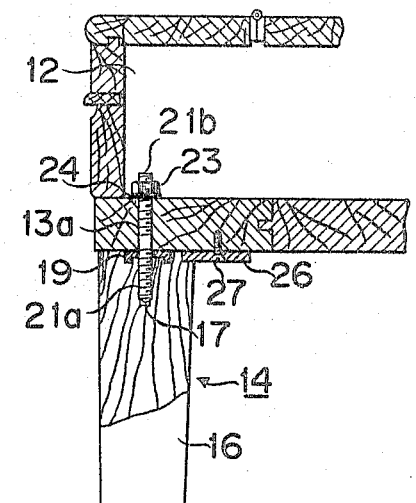
Hiroshi Miyazima
INVENTOR.

United States Patent Office 3,487,737
Patented Jan. 6, 1970

3,487,737
LEG MEMBER OF WOODEN FURNITURE
Hiroshi Miyazima, Tenryu-shi, Japan, assignor to Nippon Gakki Seizo Kabushiki Kaisha, Hamamatsu-shi, Japan, a corporation of Japan
Filed June 27, 1968, Ser. No. 740,575
Claims priority, application Japan, June 30, 1967, 42/55,993
Int. Cl. G10c 3/02
U.S. Cl. 84—177                                                    1 Claim

ABSTRACT OF THE DISCLOSURE

A leg member of wooden furniture is provided with a stud bolt vertically disposed at the upper end of the body thereof. At the upper end of the body is formed an annular groove surrounding the bolt. The leg member is further provided with a washer having an annular edge so projected as to be fitted into the groove thereby to prevent the upper end of the body from being cracked around the bolt.

BACKGROUND OF THE INVENTION

This invention relates to a leg member of wooden furniture and more particularly to a leg member of wooden furniture wherein a stud bolt is vertically disposed at the upper end of the body thereof.

The prior art leg member of wooden furniture such as an upright piano, organ and electronical musical instrument, includes a stud bolt 1 having two screws 1a and 1b formed at the upper and lower ends thereof respectively as shown in FIG. 1. The stud bolt 1 is vertically disposed at the upper end 2 of the body 3 of the leg member by forcing the screw 1b into a blind bore drilled at said upper end 2. The leg member is attached to the cabinet of the furniture (not shown in FIG. 1) in such a manner that the stud bolt is passed through the bore drilled in the attachment plate of the cabinet and the screw 1a is then engaged with a nut, thereby tightly to attach the upper end face of the leg member body 3 to the lower end face of the attachment plate.

If the body of the leg member is subjected to an impact, for instance, where the lower end of the leg member strikes against an object on the floor, then the leg member body will be inconveniently cracked along its grains as shown in FIG. 1.

These cracks are generated mainly due to the bending stress of the leg member body relative to the bolt and excessively increase in size particularly at the upper end of the leg member body. Namely, such bending stress is far more prominent at the upper end than at any other portions of the leg member body.

SUMMARY OF THE INVENTION

An object of this invention is to provide a leg member of wooden furniture sufficiently resistant to the bending stress accidentally imparted to the body thereof so as to prevent the leg member body from being cracked.

In an aspect of this invention, the leg member of wooden furniture includes a body having a blind bore drilled at the upper end thereof, a stud bolt having two screws or screw threaded portions disposed at the upper and lower ends thereof respectively, one of the screws being forced into the blind bore so as vertically to dispose the stud bolt at the upper end of the body, an annular groove formed at the upper end of the body in a manner to surround the bolt, and a washer having an annular edge projected from one side thereof so as to ensure tight engagement with the groove.

BRIEF EXPLANATION OF THE DRAWING

FIG. 1 is a perspective view of a prior art leg member of wooden furniture;
FIG. 2 is a side view of a piano provided with legs embodying this invention;
FIG. 3 is a perspective view of a leg member of this invention taken to pieces; and
FIG. 4 is a sectional side view of the piano along the axis of the leg member.

DESCRIPTION OF THE PREFERRED EMBODIMENTS

FIGS. 2, 3 and 4 indicate an upright piano provided with legs embodying this invention, only one of which is shown.

The cabinet 11 of the piano has casters 15 mounted on the lower end thereof. The cabinet 11 is provided with a key-bed 13 on which a key-board 12 is provided. The key-bed 13 has vertical through bores 13a, only one of which is shown.

A leg member 14 of this invention is attached under the key-bed 13 and has a caster 15a positioned at the lower end thereof. Further describing in detail, the leg member 14 includes a body 16 having a blind bore 17 drilled at the upper end thereof, and an annular groove 18 formed at the upper end of the body 16 in a manner to surround the blind bore 17. The leg member 14 further includes a washer 19 made of metal having an annular edge 20, and a stud bolt 21 of metal provided with two screws or screw threaded portions 21a and 21b. The screw 21a is positioned at one end of the stud bolt so as to be screwed into the blind bore 17, and the screw 21b at the other. The annular edge 20 has inner and outer diameters respectively slightly smaller than those of the groove 18, whereby the central protrusion of the upper end of the body defined by the inner wall of the groove is rigidly clamped. The washer 19 further has a bore 22 for passing the stud bolt therethrough.

From a practical point of view relative to designing, the washer 19 is preferably provided with an annular edge 31 millimeters in inner diameter, 1.6 millimeters thick and 7 millimeters high. Though originally 32 millimeters in diameter, the protrusion defined by the inner wall of the groove 17 is reduced to 31 millimeters by being forced into the interior of the washer edge 20. The bore 22 of the washer 19 is 10.5 millimeters in diameter and the stud bolt is 10 millimeters in diameter so as to be loosely fitted into the bore 22.

The leg member is attached to the key-bed 13 in such a manner that the stud bolt 21 is passed through the bore 13a and a nut 23 is then fitted on the screw 21b through spring washers 24 so as tightly to attach the upper end face of the leg member body 16 to the lower side face of the key-bed 13. At the rear end of the leg member body 16 is provided a recess 25. A metal piece 26 is attached to the lower side face of the key-bed 13 by means of set screws 27, only one of which is shown, in a manner to be partly fitted into the recess 25, whereby the leg member is exactly attached to the key-bed 13.

Surrounded by the annular edge 20 of the washer, the protrusion at the upper end of the leg member body 16 is sufficiently resistant to that bending stress of the body 16 relative to the stud bolt 21, which may be accidentally imparted, thus preventing the leg member, particularly the upper end thereof from being cracked.

Where the stud bolt 21 depresses the inner wall of the blind bore 17 by the bending stress to the extent that the peripheral wall of the stud bolt 21 is attached to the inner wall of the bore 22, the washer 19 will prevent the stud bolt 21 from being further strained in relation to the leg member body 16.

In this arrangement, the edge of the washer and the groove of the body may be shaped into a form such as a rectangle, triangle and the like.

While the invention has been described in connection with some preferred embodiments thereof, the invention is not limited thereto and includes any modifications and alterations which fall within the scope of the invention as defined in the appended claim.

What is claimed is:

1. In a piano, a cabinet (11); a key-bed (13) supported by said cabinet upwards of the floor with a lower face facing the floor and with a first bore (13a) therein; a leg member (14) under the key-bed, with a body (16) disposed to support said key-bed (13) from the floor having a rear portion towards said cabinet and having a recess (25) at said rear portion, a blind bore (17) at the upper end of said leg member aligned with said first bore (13a) an annular groove (18) surrounding said blind bore (17);

a stud bolt (21) passing through said key-bed first bore (13a) into said leg member blind bore (17) and having upper and lower screw threaded portions (21b, 21a), a nut (23) fitted on the upper screw threaded portion (21b) with washers (24) to tightly attach the upper end of said leg member (16) to the lower face of the key-bed (13); and, a flat piece (26) attached to said key-bed lower face and fitted into said recess (25).

References Cited

UNITED STATES PATENTS

| | | |
|---|---|---|
| 183,358 | 10/1876 | Wright. |
| 970,172 | 9/1910 | Bloom et al. _____ 287—128 |
| 2,672,659 | 3/1954 | Becker _____ 287—20 XR |
| 2,970,025 | 1/1961 | Wilson _____ 287—20 |

FOREIGN PATENTS

| | | |
|---|---|---|
| 917,612 | 3/1963 | Great Britain. |

DAVID J. WILLIAMOWSKY, Primary Examiner

A. V. KUNDRAT, Assistant Examiner

U.S. Cl. X.R.

287—20